(12) United States Patent
Lee

(10) Patent No.: US 10,857,891 B2
(45) Date of Patent: Dec. 8, 2020

(54) ELECTRONIC BRAKE SYSTEM

(71) Applicant: MANDO CORPORATION, Gyeonggi-do (KR)

(72) Inventor: Eun Ha Lee, Chungcheongnam-do (KR)

(73) Assignee: MANDO CORPORATION, Gyeonggi-Do (KR)

(*) Notice: Subject to any disclaimer, the term of this patent is extended or adjusted under 35 U.S.C. 154(b) by 92 days.

(21) Appl. No.: 16/141,969

(22) Filed: Sep. 25, 2018

(65) Prior Publication Data

US 2019/0092174 A1 Mar. 28, 2019

(30) Foreign Application Priority Data

Sep. 26, 2017 (KR) .................. 10-2017-0123984

(51) Int. Cl.
*B60L 7/26* (2006.01)
*B60T 13/58* (2006.01)
*B60L 7/18* (2006.01)
*B60T 8/40* (2006.01)
*B60T 8/172* (2006.01)
(Continued)

(52) U.S. Cl.
CPC ................ *B60L 7/26* (2013.01); *B60L 7/18* (2013.01); *B60T 1/10* (2013.01); *B60T 7/042* (2013.01); *B60T 8/172* (2013.01); *B60T 8/4072* (2013.01); *B60T 8/4081* (2013.01); *B60T 13/58* (2013.01); *B60T 13/586* (2013.01); *B60T 13/662* (2013.01); *B60T 13/686* (2013.01); *F16D 61/00* (2013.01); *B60L 2250/26* (2013.01); *B60T 2220/04* (2013.01); *B60T 2270/402* (2013.01);
(Continued)

(58) Field of Classification Search
CPC . B60T 1/10; B60T 8/00; B60T 13/586; B60T 13/665; B60T 13/686; B60T 13/58; B60T 13/662; B60T 7/042; B60T 8/4081; B60T 8/172; B60T 8/4072; B60T 2220/04; B60T 2270/404; B60T 2270/604; B60T 2270/82; B60T 2270/402; B60L 7/24; B60L 7/18; B60L 7/26; B60L 2250/26; F16D 61/00
USPC ............................................... 303/3
See application file for complete search history.

(56) References Cited

U.S. PATENT DOCUMENTS

2003/0080614 A1* 5/2003 Soga ................. B60K 6/44
303/152
2009/0218179 A1* 9/2009 Yokoyama ............ F16D 65/18
188/1.11 L
(Continued)

FOREIGN PATENT DOCUMENTS

| EP | 2 520 473 | 11/2012 |
|---|---|---|
| KR | 10-1339245 | 1/2014 |
| KR | 10-2016-0088076 | 7/2016 |

*Primary Examiner* — Robert A. Siconolfi
*Assistant Examiner* — San M Aung
(74) *Attorney, Agent, or Firm* — Ladas & Parry, LLP

(57) ABSTRACT

Provided are an electronic brake system and a method of controlling the same. The electronic brake system includes a pedal input unit configured to receive a pedal force according to a driver's braking intention, an estimating unit configured to estimate a temperature and a friction coefficient of a brake disk pad, and a control unit configured to correct a braking target pressure according to the driver's braking intention on the basis of the estimated temperature and friction coefficient of the brake disk pad.

13 Claims, 6 Drawing Sheets

(51) Int. Cl.
  *B60T 7/04* (2006.01)
  *B60T 1/10* (2006.01)
  *B60T 13/68* (2006.01)
  *B60T 13/66* (2006.01)
  *F16D 61/00* (2006.01)

(52) U.S. Cl.
  CPC ... *B60T 2270/404* (2013.01); *B60T 2270/604* (2013.01); *B60T 2270/82* (2013.01)

(56) References Cited

U.S. PATENT DOCUMENTS

| | | | |
|---|---|---|---|
| 2012/0139330 A1* | 6/2012 | Morishita | B60T 8/4872 303/3 |
| 2014/0025271 A1* | 1/2014 | Fahland | B60L 50/16 701/70 |
| 2018/0154875 A1* | 6/2018 | Takahashi | B60L 7/26 |

* cited by examiner

ELECTRONIC BRAKE SYSTEM

CROSS-REFERENCE TO RELATED APPLICATION

This application is based on and claims priority under 35 U.S.C. § 119 to Korean Patent Application No. 2017-0123984, filed on Sep. 26, 2017 in the Korean Intellectual Property Office, the disclosure of which is incorporated herein by reference.

BACKGROUND

1. Field

The present disclosure relates to an electronic brake system, and more specifically, to an electronic brake system that generates a braking force without an error according to a driver's intention by considering the temperature of a brake disk.

2. Description of the Related Art

Vehicles require a brake system for braking. Recently, various types of systems have been proposed for obtaining a more powerful and stable braking force.

In the case of a hybrid vehicle or an electric vehicle, a braking pressure of a friction material is compensated to correspond to a reduced regenerative braking pressure at a time of a termination of a regenerative braking.

In general, an electronic brake system includes a pressure supply device that receives a driver's braking intention as an electric signal from a pedal displacement sensor that senses a displacement of a brake pedal when the driver applies the brake pedal, and supplies a pressure to a wheel cylinder.

Such a hydraulic pressure supply device is configured such that a motor is operated according to a pedal force of the brake pedal to generate a braking pressure. In this case, the braking pressure is generated by converting the rotational force of the motor into a linear motion to press the piston.

However, when the braking pressure is generated according to the pedal force of the brake pedal, the temperature of a disk, which varies with the temperature, the humidity, or the like during a stroke operation of the brake pedal, is not considered, thereby failing to produce a deceleration desired by the driver.

In recent years, studies have been conducted on an electronic brake system and a method of controlling the same, in which a target pressure is compensated with a friction coefficient of a brake disk pad that varies depending on the temperature to form a constant deceleration during braking of the brake pedal stroke.

RELATED ART DOCUMENT

Patent Document

European Patent: 2 520 473 A1 (Honda motor co., ltd.) 2012 Nov. 7.

SUMMARY

Therefore, it is an object of the present disclosure to provide an electronic brake system and a method of controlling the same in which the temperature of the brake disk is estimated and a deceleration desired by a driver is provided regardless of the external temperature.

Additional aspects of the disclosure will be set forth in part in the description which follows and, in part, will be obvious from the description, or may be learned by practice of the disclosure.

Therefore, it is an aspect of the present disclosure to provide an electronic brake system including: a pedal input unit configured to receive a pedal force according to a driver's braking intention; and a control unit configured to calculate a braking target pressure according to the driver's braking intention, and perform a hydraulic control by an error between a target pressure adjusted on the basis of a target pressure compensation ratio and an actual regenerative braking pressure.

The control unit may further include: a regenerative braking cooperative control unit configured to perform a regenerative braking cooperative control on the electronic brake system, wherein the regenerative braking cooperative control unit may compensate a torque factor at a time of a regenerative braking in consideration of an estimated temperature of a disk pad and an estimated friction coefficient of the disk pad.

The control unit may set the target pressure compensation ratio and a torque factor compensation ratio to differ for each preset temperature section.

The control unit may calculate an actual target pressure on the basis of the target pressure compensation ratio, calculate an actual regenerative braking pressure on the basis of the torque factor compensation ratio, and calculate a hydraulic braking force according to a difference between the calculated target pressure and actual regenerative braking pressure.

The control unit may perform a hydraulic control to secure the calculated hydraulic braking force.

It is another aspect of the present disclosure, an electronic brake system includes: a pedal input unit configured to receive a pedal force according to a driver's braking intention; an estimating unit configured to estimate a temperature and a friction coefficient of a brake disk pad; and a control unit configured to compensate a target pressure according to the pedal force received by the pedal input unit, on the basis of the estimated temperature and friction coefficient of the brake disk pad.

The control unit may further include: a regenerative braking cooperative control unit configured to perform a regenerative braking cooperative control on the electronic brake system, wherein the regenerative braking cooperative control unit may compensate a torque factor at a time of a regenerative braking in consideration of an estimated temperature of a disk pad and an estimated friction coefficient of the disk pad.

The control unit may set a target pressure compensation ratio and a torque factor compensation ratio to differ for each preset temperature section.

The control unit may calculate an actual target pressure on the basis of the target pressure compensation ratio, calculate an actual regenerative braking pressure on the basis of the torque factor compensation ratio, and calculate a hydraulic braking force according to a difference between the calculated target pressure and actual regenerative braking pressure.

The control unit may perform a hydraulic control to secure the calculated hydraulic braking force.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. In order to make the description of the present disclosure clear, unrelated parts are not shown and, the sizes of components are exaggerated for clarity.

Figure 1:
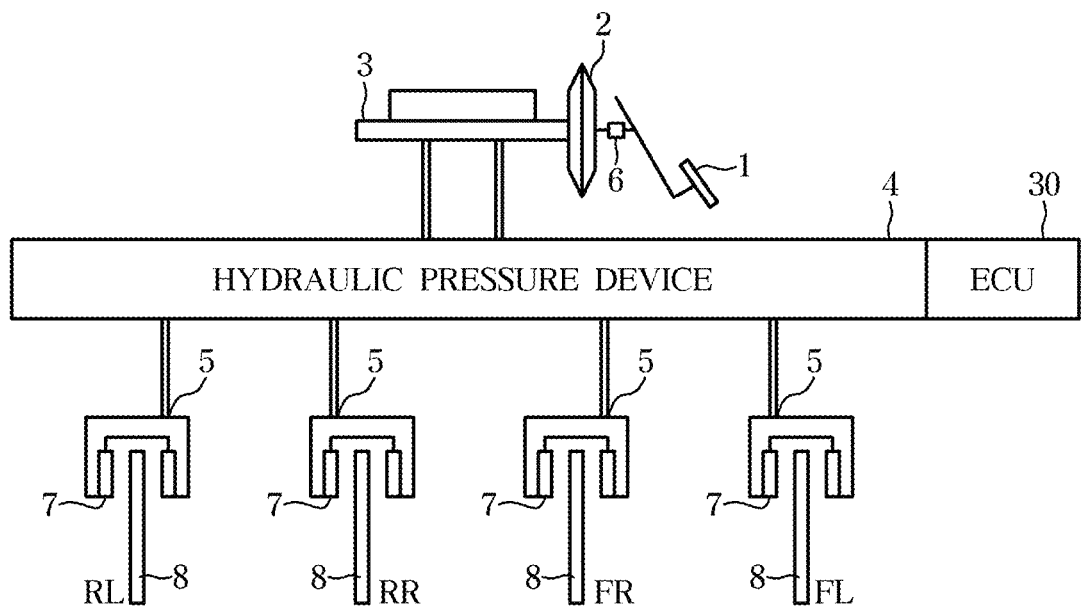
FIG. 1 is a schematic view illustrating an electronic brake system including brake pads of wheels according to an embodiment of the present disclosure.

FIG. 1 is a schematic view illustrating an electronic brake system using a method of controlling an electronic brake system according to an embodiment of the present disclosure.

Referring to FIG. 1, the electronic brake system generates a braking force on the basis of a pedal force by which the driver applies a brake pedal 1 to decelerate the vehicle.

The electronic brake system boosts the pedal force by which the driver applies the brake pedal 1 in a booster 2, and generates a brake hydraulic pressure according to the boosted pedal force in a master cylinder 3. The brake hydraulic pressure generated in the master cylinder 3 or a hydraulic pressure device 4 is provided to each wheel cylinder 5 provided in a brake mechanism of each of vehicle wheels FR, FL, RR, and RL such that a braking force is generated for each vehicle wheel FR, FL, RR, and RL.

The hydraulic pressure device 4 for generating and supplying a brake hydraulic pressure is provided between the master cylinder 3 and each wheel cylinder 5.

The hydraulic pressure device 4 is configured to generate and/or supply a brake hydraulic pressure to perform various controls for improving the safety of the vehicle.

The various controls using the hydraulic pressure device 4 are executed in an electronic control unit (ECU) 30.

The electronic brake system is configured to sense a brake pedal stroke through a pedal stroke sensor 6 that senses a stroke of the brake pedal 1 when the driver applies the brake pedal 1, calculate a target pressure using the sensed brake pedal stroke, and adjust the pressure of each wheel cylinder 5 according to the target pressure calculated using the hydraulic pressure device 4 to thereby a braking force for each vehicle wheel FR, FL, RR, or RL.

The hydraulic pressure device 4 may normally transmit a master cylinder pressure generated in the master cylinder 3 to each wheel cylinder 5 as it is, but when the brake control is required, may generate a brake hydraulic pressure and adjust the brake hydraulic pressure supplied to each wheel cylinder 5 to thereby increase or decrease the brake pressure of each wheel cylinder 5.

Brake pads 7 are forced against a brake disk 8 by the pressure of each wheel cylinder 5, generating a braking force for each of the wheels FR, FL, RR or RL.

Figure 2:
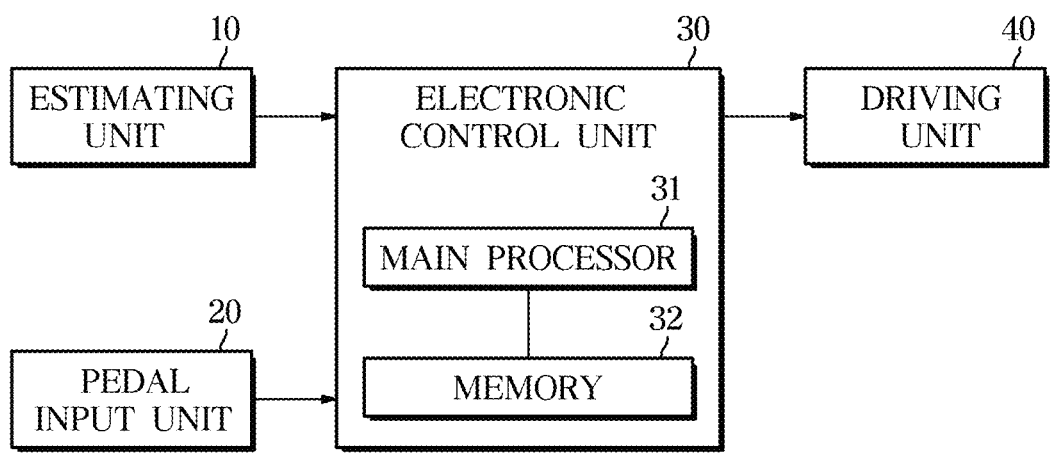
FIG. 2 is a schematic block diagram illustrating an electronic brake system according to an embodiment of the present disclosure.
Figure 3:
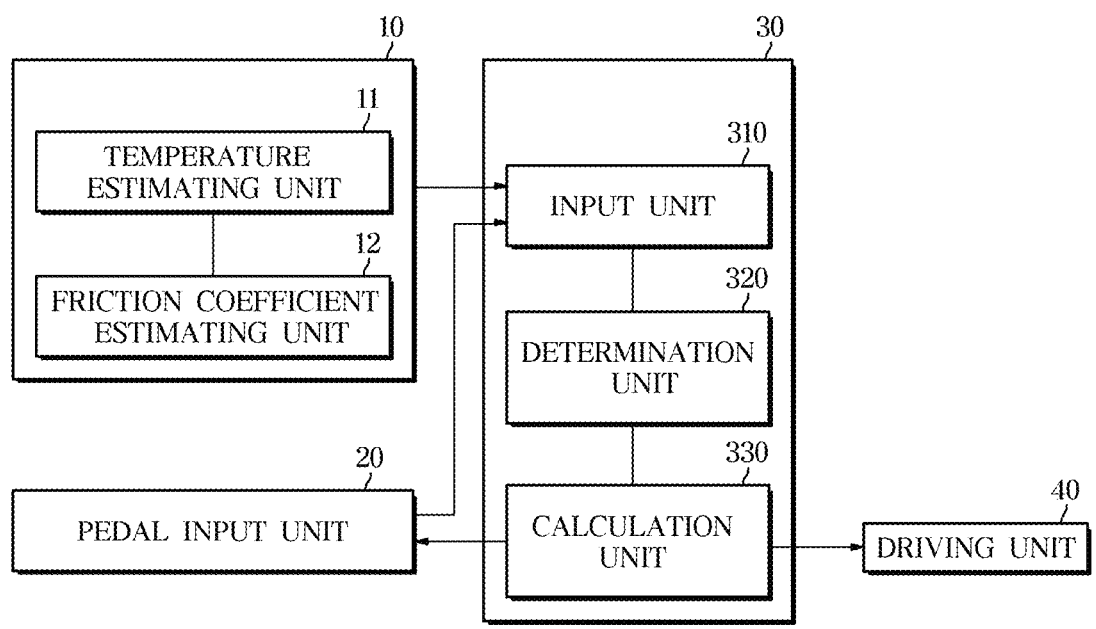
FIG. 3 is a detailed block diagram illustrating an electronic brake system according to an embodiment of the present disclosure.

FIG. 2 is a schematic block diagram illustrating an electronic brake system according to an embodiment of the present disclosure, and FIG. 3 is a detailed block diagram illustrating an electronic brake system according to an embodiment of the present disclosure.

Referring to FIGS. 2 to 3, an electronic brake system 1 according to an embodiment of the present disclosure includes an estimating unit 10, a pedal input unit 20, an electronic control unit 30, and a driving unit 40.

In addition, referring to FIG. 2, the estimating unit 10 includes a temperature estimating unit 11 for estimating the temperature of the brake disk pad and a friction coefficient estimating unit 12 for estimating a friction coefficient of the brake disk pad on the basis of the estimated temperature.

Although not shown, the electronic brake system 1 includes a caliper housing to which pad plates with brake pads are fixed and a hydraulic pressure generated from the master cylinder is supplied, a piston inserted into the cylinder to make a linear motion by a hydraulic pressure supplied to the cylinder, pad plates mounted at an end of the piston and to which the brake pads are attached, and a brake disk disposed between the two brake pads and mounted on a drive shaft.

Accordingly, the temperature estimating unit 11 estimates the temperature of the brake pad in the electronic brake system. That is, the temperature of the brake pad changes according to the external temperature and humidity, and the friction coefficient between the two brake pads and the disk changes depending on the changed temperature.

Accordingly, the friction coefficient estimating unit 12 estimates the friction coefficient on the basis of the temperature estimated by the temperature estimating unit 11. In practice, the friction coefficient estimating unit 12 estimates a compensation rate of the friction coefficient, and the friction coefficient may be determined on the basis of the estimated compensation rate of the friction coefficient.

A compensation rate determining unit 13 in the estimating unit 10 determines a compensating rate according to the estimated friction coefficient in order to secure a deceleration corresponding to the driver's braking intention determined by the pedal input unit 20.

In this case, in order to identify the braking intention of the driver, the pedal input unit 20 measures a driver's pedal force input to the electronic brake system 1.

Although not shown in the drawing, the pedal input unit 20 in the electronic brake system 1 according to the embodiment of the present disclosure includes a pedal displacement sensor (not shown) for sensing a displacement of a brake pedal (not shown).

That is, the pedal input unit 20 receives the driver's braking intention from the pedal displacement sensor as an electrical signal, by using a pressure sensor or a pedal displacement sensor.

The electronic control unit 30 collectively controls the electronic brake system 1 according to the present disclosure, and includes a main processor 31 for generating and transmitting control signals on the basis of the electrical signals received from the estimating unit 10 and the pedal input unit 20, and a memory 32 for storing various control signals and control methods.

The memory 32 may store various data necessary for the operation of the main processor 31, including not only a volatile memory, such as an SRAM (S-RAM) or a D RAM (D-RAM), but also a non-volatile memory, such as a flash memory, a read only memory (ROM), an erasable programmable read only memory (EPROM), and an electrically erasable programmable read only memory (EEPROM).

The nonvolatile memory may semi-permanently store a control program and control data for controlling the operation of the electronic brake system 1, and the volatile memory may temporarily store control programs and control data imported from the nonvolatile memory, and various types of sensor information and control signals output from the main processor.

For example, the non-volatile memory may store a plurality of temperature sections discretely.

In FIG. 2, a hardware configuration of the electronic control unit 30 is illustrated, and an operation of the main processor 31 of the electronic control unit 30 is controlled by a software configuration including an input unit 310, a determination unit 320, and a calculation unit 330 as shown in FIG. 3.

Accordingly, the operations of the input unit 310, the determination unit 320, and the calculation unit 330 may be described as the operations of the main processor 31 of the electronic control unit 30.

First, the input unit 310 receives a driver's pedal force obtained from the pedal input unit 20 and the temperature and the friction coefficient of the brake disk pad estimated by the estimating unit 10.

Then, the determination unit 320 determines a region of the previously stored plurality of temperature sections to which the estimated temperature of the brake disk pad belongs.

Figure 4:
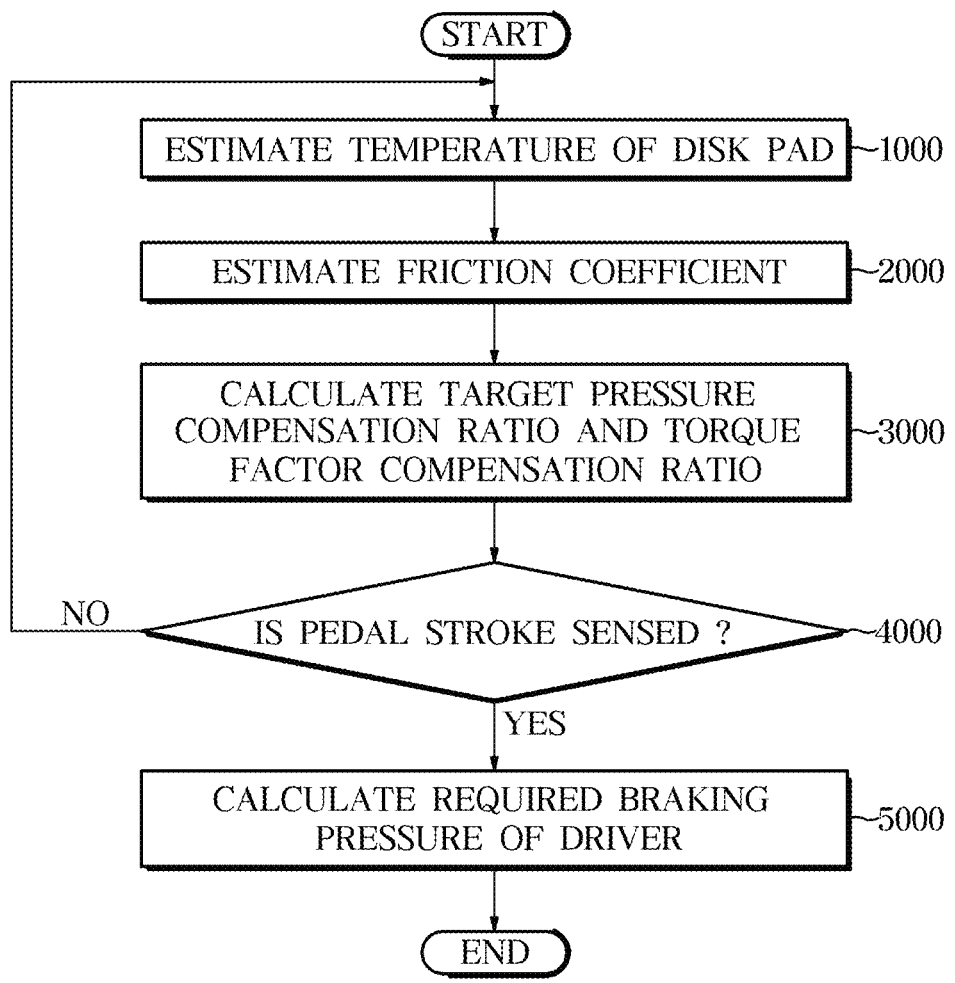
FIG. 4 is a flowchart showing a method of controlling an electronic brake according to an embodiment of the present disclosure.
Figure 5:
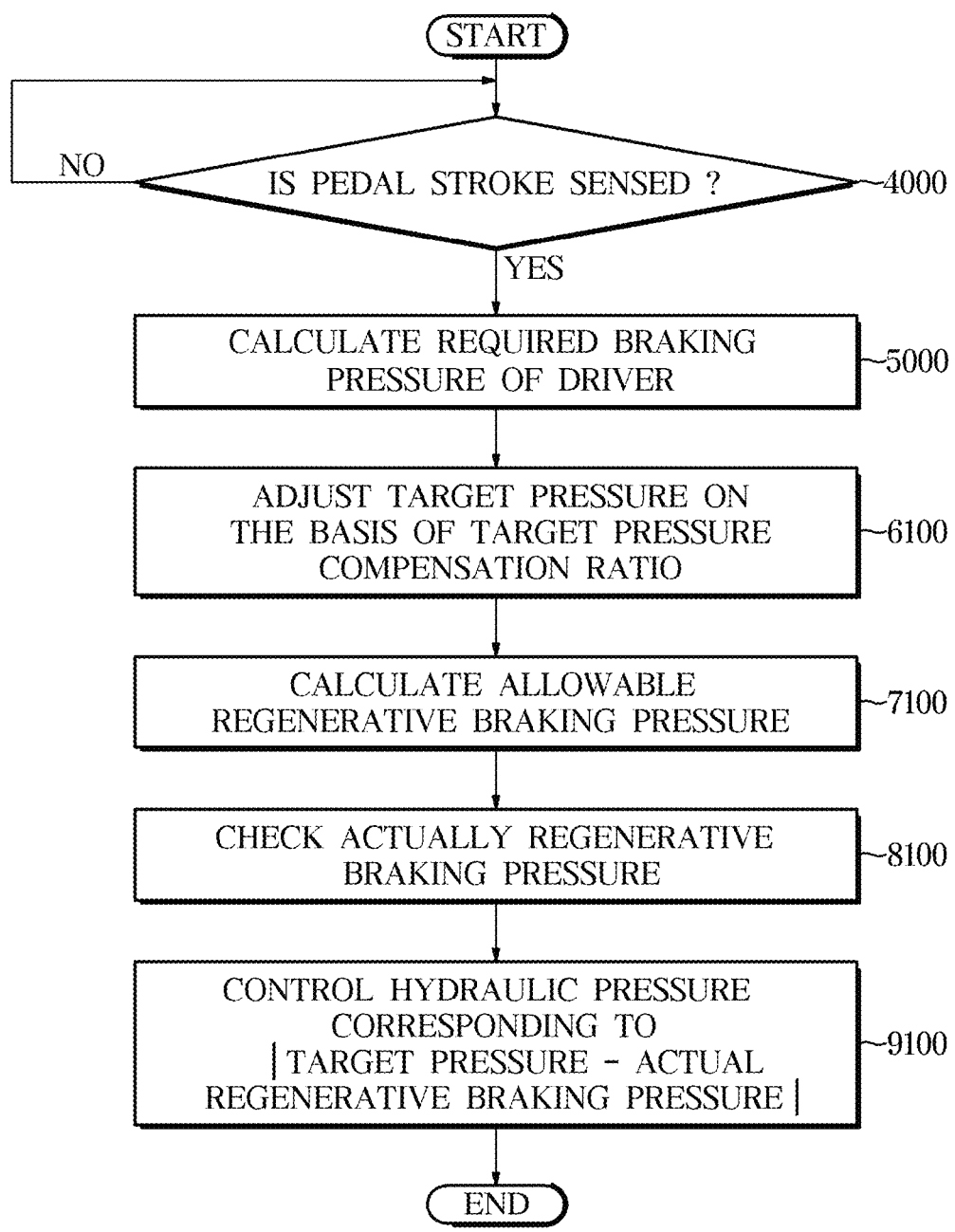
FIG. 5 is a flowchart showing a method of controlling an electronic brake according to another embodiment of the present disclosure.

In detail, FIGS. 4 and 5 are flowcharts showing a method of controlling the electronic brake system 1 according to the present disclosure. FIG. 4 is a flowchart showing a method of calculating a target pressure compensation ratio of the electronic brake system according to the present disclosure, and FIG. 5 is a flowchart showing a method of performing a regenerative brake cooperative control by calculating a target pressure compensation ratio and a torque factor compensation ratio for a regenerative brake cooperative control.

First, referring to FIG. 4, the electronic brake system 1 according to the present discloses estimates the temperature of the disk pad (1000). That is, the temperature estimating unit 11 of the electronic brake system 1 may estimate the temperature of the disk pad by checking the temperature change of the disk pad according to the external temperature and the humidity and the temperature change of the disk pad caused by the frictional heat due to the continuous braking.

Next, the electronic brake system 1 estimates the friction coefficient of the disk pad on the basis of the estimated temperature (2000). That is, the friction coefficient estimating unit 12 of the estimating unit 10 may estimate the friction coefficient of the brake disk pad changed according to the temperature change.

Thereafter, the electronic brake system 1 determines a compensation ratio on the basis of the estimated temperature and the estimated friction coefficient (3000). In detail, the electronic control unit 30 may calculate a target pressure compensation ratio and a torque factor compensation ratio.

In this case, the target pressure compensation ratio and the torque factor compensation ratio may be discretely determined according to the estimated temperature sections. Alternatively, the target pressure compensation ratio and the torque factor compensation ratio may linearly differ according to the temperatures. The target pressure compensation ratio and the torque factor compensation ratio will be described later with reference to FIGS. 6 to 8.

At this time, when the electronic brake system 1 senses a pedal stroke according to a driver's deceleration intention (YES in operation 4000), the electronic control unit 30 calculates a required braking pressure of the driver (5000)

A method of performing a hydraulic control through a torque factor compensation for a regenerative braking cooperative and a target pressure compensation control will be described later with reference to FIG. 5.

When the electronic brake system 1 senses a pedal stroke according (YES in operation 4000), the electronic control unit 30 calculates a required braking pressure of the driver corresponding to the sensed pedal stroke (5000), and adjusts a target pressure value according to a target pressure compensation ratio based on the estimated friction coefficient described with reference to FIG. 4 (6100).

Further, the electronic brake system 1 according to the present disclosure calculates an allowable regenerative braking rate for a regenerative braking cooperative control (7100). However, operation 7100 of calculating the allowable regenerative braking rate for the regenerative braking cooperative control according to the embodiment may be performed simultaneously with operation 6100 of adjusting the target pressure value according to the target pressure compensation ratio.

The electronic control unit 30, after calculating the allowable regenerative braking rate for the regenerative braking cooperative control, checks an actually applied regenerative braking pressure in consideration of the previously calculated torque factor compensation ratio for the regenerative braking cooperation control (8100).

Accordingly, the electronic brake system 1 according to the present disclosure may perform control to generate a hydraulic pressure corresponding to the difference between the required braking rate based on the target pressure adjusted on the basis of the target pressure compensation ratio calculated in operation 6100 and the actual applied regenerative braking pressure value (9100).

Figure 6:
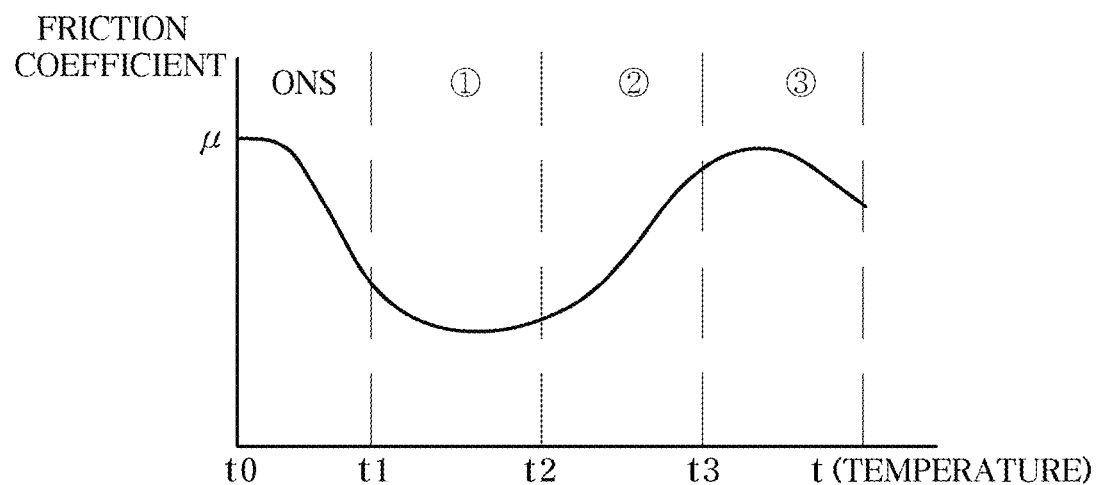
FIGS. 6 to 8 are schematic views illustrating a friction coefficient, a target pressure compensation ratio, and a torque factor compensation ratio according to the temperature of an electronic brake system according to an embodiment of the present disclosure.

In detail, FIG. 6 is a schematic view illustrating a target pressure compensation ratio and a torque factor compensation ratio of the electronic brake system according to the embodiment of the present disclosure according to temperatures.

Figure 7:
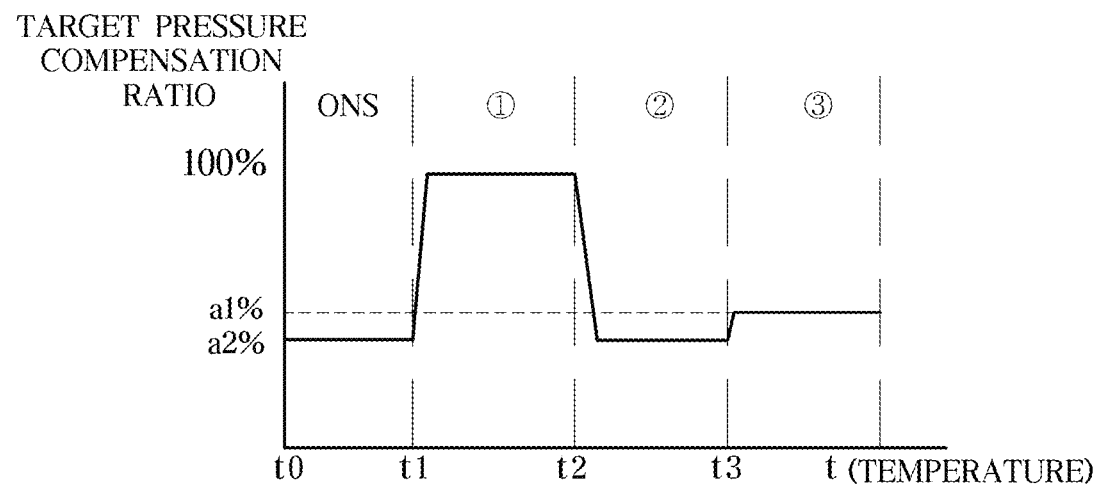
Figure 8:
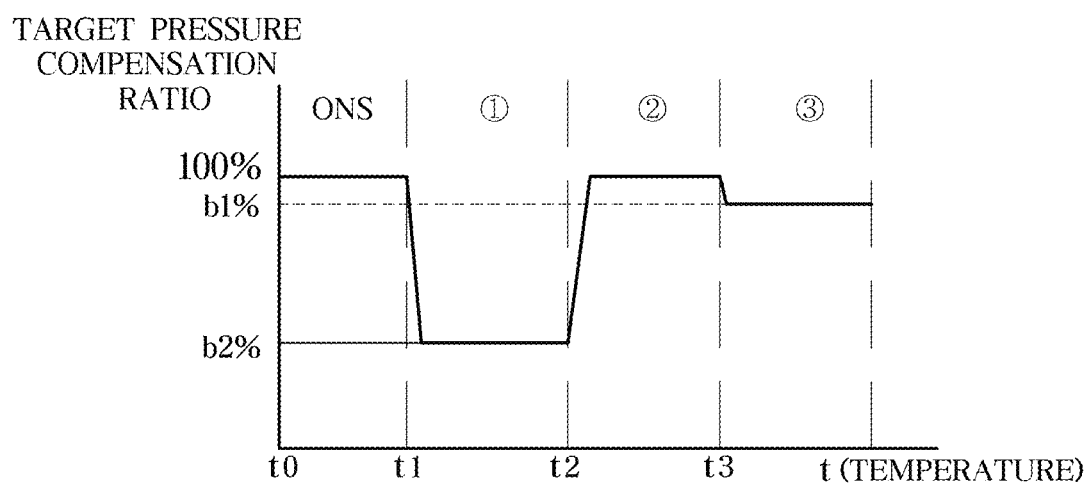

In detail, FIG. 6 is a graph showing a friction coefficient according to temperature sections, FIG. 7 is a graph showing a target pressure (TP) compensation ratio according to temperature sections, and FIG. 8 is a graph showing a torque factor compensation ratio according to temperature sections.

In this case, the temperature sections according to the embodiment shown in FIG. 6 are divided into four sections, but the present disclosure is not limited thereto. The temperature sections may be set differently depending on the state and type of the electronic brake system 1. For example, the temperature sections may be divided into a number of sections more than four sections such that the target pressure compensation ratio according to temperature sections are more specifically set.

At this time, the target pressure compensation ratio set according to the temperature section may be arbitrarily set, and may be changed with a parameter value.

In detail, the temperature sections shown in FIG. 6 are divided into a region ① of a low temperature state having a temperature lower than "a first temperature", which indicates an Overnight Soaking (ONS) section, i.e., an overnight parking state, a region ② of an intermediate temperature state having a temperature higher than "the first temperature" and lower than "a second temperature", and a region ③ of a high temperature state having a temperature higher than "the second temperature", and FIG. 6 shows an embodiment illustrating friction coefficients according to the divided three regions.

The overnight parking is a state in which a brake disk pad is not used at all and thus friction heat is not generated at all. The temperature of the brake disk pad is not only influenced by the external temperature and humidity but also influenced by the heat generated due to a continuous use of the electronic brake system 1, causing rise to a high temperature.

Accordingly, the determination unit 320 determines a section to which the temperature of the brake disk pad obtained from the input unit 310 belongs.

Then, when the temperature section of the brake disk pad determined by the determination unit 320 is checked, the calculation unit 330 calculates a target pressure compensation ratio and a torque factor compensation ratio. The target pressure compensation ratio determined by the calculation unit 330 may be set to a certain value depending on a section to which the current temperature of the brake disk pad belongs.

For example, referring to FIG. 7, when the temperature of the brake disk pad is determined to belong to the region ② by the determination unit 320, the target pressure compensation ratio is set to decrease to a1%, and when the temperature of the brake disk pad is determined to belong to the region ③, the target pressure compensation ratio is set to decrease to a2%, As such, the electronic control unit 30 may set the target pressure compensation ratios for respective temperature sections, such as a1% and a2%, in advance, or may set the target pressure compensation ratio to differ linearly, rather than for temperature sections.

That is, the calculating unit 330 sets the target pressure compensation ratio for each set temperature section such that a constant deceleration may be formed irrespective of the generation of frictional heat according to the temperature of the brake pad in the pedal stroke operation according to the pedal force applied by the driver.

In addition, a factor for converting the pressure and torque in a regenerative braking cooperation control of the electronic brake system 1 according to the present disclosure, that is, a torque factor is given a compensation value.

That is, when the target pressure compensation ratio changes to a1% or a2%, the torque factor compensation ratio is changed by the calculation unit 330 to correspond to the change in the target pressure compensation ratio. Referring to FIGS. 4 and 5, the torque factor compensation ratio may be corrected to a value b1% when the target pressure compensation ratio is a1%, and to a value b2% when the target pressure compensation ratio is a2%.

In addition, the electronic control unit 30 may set the torque factor compensation ratios for temperature sections in advance, such as b1% and b2%. However, when the target pressure compensation ratio is set to differ linearly, the torque factor compensation ratios may also be set to change linearly.

Accordingly, the calculating unit 330 calculates the torque factor compensation ratio which is applied to the torque factor value for converting a pressure and a torque in a regenerative braking cooperative control, for the electronic brake system 1 that performs a regenerative braking coordination control, so that a constant deceleration may be formed even in the regenerative braking cooperation control.

The driving unit 40 operates the electronic brake system 1 according to a control signal calculated by the electronic control unit 30 including the input unit 310, the determination unit 320, and the calculation unit 330.

For example, the electronic brake system 1 is driven to secure the target pressure in consideration of the target pressure compensation ratio calculated by the calculation unit 330.

Further, for example, the electronic brake system 1 performs a regenerative braking coordinative control according to the torque factor compensation value calculated by the calculating unit 330 for the regenerative braking cooperation control.

In this case, the driving unit 40 includes a plurality of valves including a circuit constituting the electronic brake system 1, and operates the plurality of valves to secure the target pressure.

In addition, the driving unit 40 may operate to move two brake pads by operating the piston on a hydraulic pressure generated in the master cylinder of the electronic brake system 1.

As is apparent from the above, the target pressure is corrected with the friction coefficient of the brake disk pad, so that a constant deceleration can be formed during braking of a brake pedal stroke.

In addition, even at a time of a regenerative braking cooperative control, a constant deceleration can be formed by providing a compensation value according to a change in temperature of the brake disk pad.

The above description of the present disclosure is made in relation to the embodiments. A person having ordinary skilled in the art should appreciate that other specific modifications may be easily made without departing from the technical spirit or essential features of the present disclosure and it should also be understood that all changes or modifications derived from the definitions and scope of the claims and their equivalents fall within the scope of the present disclosure.

What is claimed is:

1. An electronic brake system comprising:
a pedal input unit configured to receive a pedal force according to a driver's braking intention; and
a control unit configured to:
calculate a braking target pressure according to the driver's braking intention, and perform a hydraulic control by an error between a target pressure adjusted on the basis of a target pressure compensation ratio and an actual regenerative braking pressure, and
perform a regenerative braking cooperative control on the electronic brake system,
wherein the control unit compensates a torque factor at a time of a regenerative braking in consideration of an estimated temperature of a disk pad and an estimated friction coefficient of the disk pad.

2. The electronic brake system of claim 1, wherein the control unit sets the target pressure compensation ratio and a torque factor compensation ratio to differ for each preset temperature section.

3. The electronic brake system of claim 2, wherein the control unit calculates an actual target pressure on the basis of the target pressure compensation ratio, calculates an actual regenerative braking pressure on the basis of the torque factor compensation ratio, and calculates a hydraulic braking force according to a difference between the calculated target pressure and actual regenerative braking pressure.

4. The electronic brake system of claim 3, wherein the control unit performs a hydraulic control to secure the calculated hydraulic braking force.

5. An electronic brake system comprising:
a pedal input unit configured to receive a pedal force according to a driver's braking intention;
an estimating unit configured to estimate a temperature and a friction coefficient of a brake disk pad; and
a control unit configured to:
compensate a target pressure according to the pedal force received by the pedal input unit, on the basis of the estimated temperature and friction coefficient of the brake disk pad, and
perform a regenerative braking cooperative control on the electronic brake system,
wherein the control unit compensates a torque factor at a time of a regenerative braking in consideration of an estimated temperature of a disk pad and an estimated friction coefficient of the disk pad.

6. The electronic brake system of claim 5, wherein the control unit sets a target pressure compensation ratio and a torque factor compensation ratio to differ for each preset temperature section.

7. The electronic brake system of claim 6, wherein the control unit calculates an actual target pressure on the basis of the target pressure compensation ratio, calculates an actual regenerative braking pressure on the basis of the torque factor compensation ratio, and calculates a hydraulic braking force according to a difference between the calculated target pressure and actual regenerative braking pressure.

8. The electronic brake system of claim 7, wherein the control unit performs a hydraulic control to secure the calculated hydraulic braking force.

9. An electronic brake system comprising:
a pedal input unit configured to receive a pedal force according to a driver's braking intention; and
a control unit configured to:
calculate a braking target pressure according to the driver's braking intention,
adjust the braking target pressure by a target pressure compensation ratio, and
perform a hydraulic control according to difference between the braking target pressure, adjusted by the target pressure compensation ratio, and an actual regenerative braking pressure.

10. The electronic brake system of claim 9, wherein the control unit is configured to perform a regenerative braking cooperative control on the electronic brake system,
wherein the control unit compensates a torque factor at a time of a regenerative braking in consideration of an estimated temperature of a disk pad and an estimated friction coefficient of the disk pad.

11. The electronic brake system of claim 10, wherein the control unit sets the target pressure compensation ratio and a torque factor compensation ratio to differ for each preset temperature section.

12. The electronic brake system of claim 11, wherein the control unit calculates the actual regenerative braking pressure on the basis of the torque factor compensation ratio, and calculates a hydraulic braking force according to a difference between the adjusted braking target pressure and the actual regenerative braking pressure.

13. The electronic brake system of claim 12, wherein the control unit performs a hydraulic control to generate the calculated hydraulic braking force.

* * * * *